United States Patent
Head et al.

(10) Patent No.: US 9,562,802 B2
(45) Date of Patent: Feb. 7, 2017

(54) FLEX CIRCUIT INTERFACE FOR STRAIN GAUGES

(71) Applicant: Illinois Tool Works Inc., Glenview, IL (US)

(72) Inventors: James A. Head, Fairmont, MN (US); Kevin M. Fruechte, Fairmont, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 359 days.

(21) Appl. No.: 13/947,258

(22) Filed: Jul. 22, 2013

(65) Prior Publication Data

US 2015/0021105 A1    Jan. 22, 2015

(51) Int. Cl.
  *G01G 3/14*  (2006.01)
  *G01G 21/18*  (2006.01)
  *G01L 1/20*  (2006.01)

(52) U.S. Cl.
  CPC .............. *G01G 3/1402* (2013.01); *G01G 3/14* (2013.01); *G01G 21/18* (2013.01); *G01L 1/205* (2013.01)

(58) Field of Classification Search
  CPC ...... G01G 3/14; G01G 3/1402; G01G 3/1404; G01G 3/1406; G01G 3/1408; G01G 3/141; G01G 3/1412; G01G 3/12; G01G 3/13; G01G 21/18; G01L 1/20; G01L 1/205; G01L 1/22; G01L 1/2206; G01L 1/2212; G01L 1/2218; G01L 1/2225; G01L 1/2231; G01L 1/2237; G01L 1/2243
  See application file for complete search history.

(56) References Cited

U.S. PATENT DOCUMENTS

| | | | | |
|---|---|---|---|---|
| 4,217,785 A * | 8/1980 | Spoor | | 73/766 |
| 4,299,130 A * | 11/1981 | Koneval | | 73/766 |
| 4,322,707 A * | 3/1982 | Ort | | 338/2 |
| 4,325,048 A * | 4/1982 | Zaghi et al. | | 338/3 |
| 4,432,247 A * | 2/1984 | Takeno et al. | | 73/862.623 |
| 4,520,339 A * | 5/1985 | Utsunomiya | | 338/5 |
| 5,837,946 A * | 11/1998 | Johnson et al. | | 177/136 |
| 5,915,285 A * | 6/1999 | Sommer | | 73/865.7 |
| 5,929,390 A * | 7/1999 | Naito et al. | | 177/211 |
| 7,989,714 B2 | 8/2011 | Kresina | | |
| 2003/0061884 A1 * | 4/2003 | Miodushevsky | | 73/795 |
| 2004/0027228 A1 * | 2/2004 | Stevens | | 338/2 |
| 2004/0163481 A1 * | 8/2004 | Lockery et al. | | 73/862.628 |
| 2007/0255424 A1 * | 11/2007 | Leydet et al. | | 623/24 |

OTHER PUBLICATIONS

Omega Strain Gauge tutorial, downloaded Jul. 31, 2015.*

* cited by examiner

*Primary Examiner* — Natalie Huls
(74) *Attorney, Agent, or Firm* — Nelson Mullins Riley & Scarborough LLP

(57) ABSTRACT

A load cell may include a bar having a supported end, an unsupported end and a sensor holding portion disposed between the supported end and the unsupported end. The load cell may further include a plurality of electronic sensors including a first strain gauge pair and a second strain gauge pair disposed along the sensor holding portion. The load cell may further include an interface member directly connecting the electronic sensors for weight calculation responsive to application of a load to the unsupported end. In some cases, the interface member may include a flex circuit.

16 Claims, 5 Drawing Sheets

FLEX CIRCUIT INTERFACE FOR STRAIN GAUGES

TECHNICAL FIELD

Example embodiments generally relate to weighing equipment and, more particularly, relate to a flexible interface for use in connection with weighing equipment that employs strain gauges.

BACKGROUND

A strain gauge is a well known device that can be used to measure the strain being exerted on an object. In particular, for example, a strain gauge may be attached to a stressed section of a scale platform to determine the amount of force or strain exerted on the corresponding section. The amount of force or strain measured can then be used to determine the weight of the load on the scale platform.

An electronic transducer, also known as a load cell, operates utilizing four or more strain gauges wired together to establish a Wheatstone bridge electrical circuit. The load cell has become a relatively popular method of accomplishing commercial weighing. The load cell converts a mechanical movement associated with an applied force into an electrical signal. Thus, load cells can be particularly susceptible to environmental conditions which may impact the accuracy of the load cells. Outdoor environments or other environments in which shock and/or vibration may be encountered can present challenging environments for load cells relative to providing accurate results. Accordingly, continual and often costly maintenance programs and/or the use of additional components had been required to try to ensure continued accuracy of the scales that employed these load cells.

The Weigh-Bar® was developed to overcome some of the sensitivities of the traditional load cell, including side loads, end loads, torsion loads shock loads and vibration loads. This is accomplished via a combination of a large cantilever loading element and arranging the strain gages in a differential pattern within the Wheatstone bridge, as opposed to the maximum signal pattern used with traditional load cells. Other than the load cell body size, orientation and Wheatsone bridge arrangement, the Weigh-Bar® and load cell are very similar from a manufacturing standpoint.

Generally speaking, the strain gauges (or electronic sensors) of the load cell are positioned on outside surfaces of the load cell body. A simple potted seal may be employed along with the relatively rugged design of the load cell to avoid the use of a complex vacuum-type hermetic seal that would typically be used with a load cell. The load cell itself (e.g., when configured as a Weigh-Bar®) may be provided as a steel structure with two pairs of electronic sensors (e.g., a top pair and a bottom pair) disposed along an external surface of the load cell. The load cell may be positioned in a cantilevered arrangement, fixed at one end and unsupported at the other. When a force is applied to the unsupported end, a strain is generated along the length of the load cell. The top pair and bottom pair of electronic sensors (or strain gauges) each measure the strain at their respective locations along the load cell. Each respective location of the sensor pairs represents a separate corresponding bending moment. By comparing the respective strain measurements, the weight of the load on the load cell can be accurately determined while undesirable effects related to end loading, side loading and torsion effect can be minimized or eliminated.

Although the use of Weigh Bars® and load cells employing strain gauges in the manner described above is common, improvements in the design and performance of such Weigh Bars® and load cells may still be desirable.

BRIEF SUMMARY OF SOME EXAMPLES

Some example embodiments may provide a flex circuit interface for providing operable coupling between the respective strain gauges of a load cell. Using a flex circuit interface may enable the use of wiring for interconnecting strain gauges to be eliminated.

In an example embodiment, a load cell may be provided. The load cell may include a bar having a supported end, an unsupported end and a sensor holding portion disposed between the supported end and the unsupported end. The load cell may further include a plurality of electronic sensors including a first strain gauge pair and a second strain gauge pair disposed along the sensor holding portion. The load cell may further include an interface member directly connecting the electronic sensors for weight calculation responsive to application of a load to the unsupported end. In some cases, the interface member may include a flex circuit.

Some example embodiments may improve the performance and reliability of load cells employing an example embodiment. Some example embodiments may also reduce the cost of producing the load cells.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
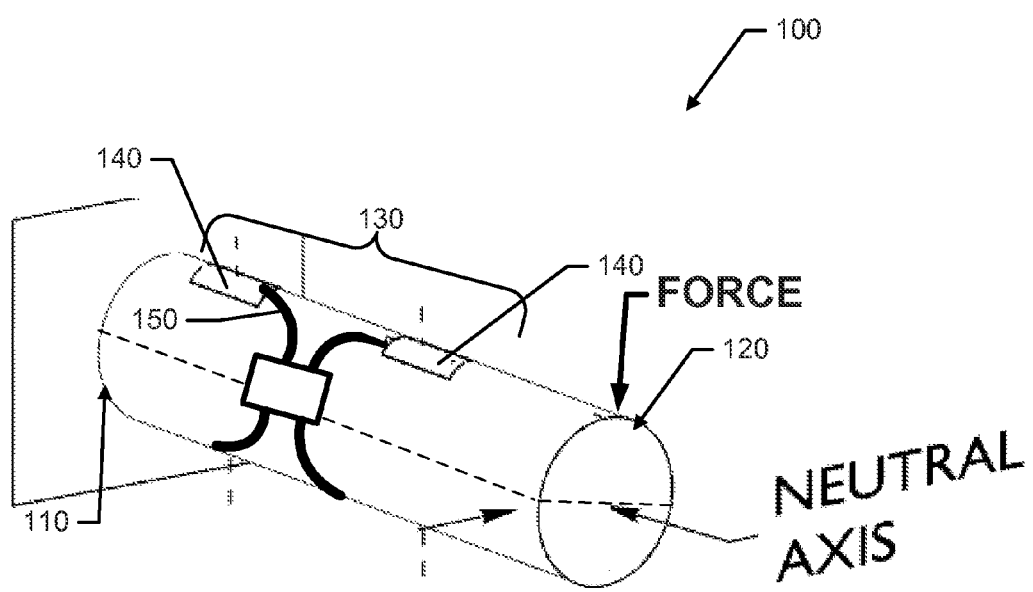
FIG. 1 illustrates a conceptual view of a load cell according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the performance and/or reduce the cost of a load cell such as a Weigh Bar®. In particular, the load cell may be provided without any physical wires running between the electronic sensors or strain gauges of the load cell. Instead, a flex circuit may be employed as a strain gauge interface member to connect the strain gauges directly. The interface member may connect the strain gauges and also complete the Wheatstone bridge circuit used to enable operation of the load cell for making weight measurements. The interface member may also provide an interface to a main cable or other connectors of the load cell.

FIG. 1 illustrates a conceptual view of a load cell according to an example embodiment. The load cell 100, which may be embodied as a bar, rod or other structure that can be supported in a cantilevered fashion, may include a supported end 110 and an unsupported end 120. The load cell 100 may also include a sensor holding portion 130 on which a plurality of electronic sensors may be provided. The supported end 110, the unsupported end 120 and the sensor holding portion 130 may each be substantially cylindrically shaped stainless steel rods or portions of such rods. In some cases, the rods may have mounting holes or receptacles formed therein.

The electronic sensors may be strain gauges 140 that are disposed in pairs along the length of the sensor holding portion 130. In an example embodiment one of the pairs may be disposed on a top side of the sensor holding portion 130 and the other pair of sensors may be disposed at a bottom side of the sensor holding portion 130. One sensor from the top pair may be located at substantially the same distance along the length of the sensor holding portion 130 as a corresponding sensor from the bottom pair for each of two locations along the length of the sensor holding portion 130. As indicated above, strain measurements at these locations may be used to determine the weight of an applied load at the unsupported end 120 of the load cell 100.

In some embodiments, the sensor holding portion 130 may be provided with protective potting (not shown) concentrically disposed around the sensor holding portion 130. The protective potting may be used to protect the strain gauges 140 and any connective interface provided therebetween from potential damage or fouling. The protective potting may be sealed to the sensor holding portion 130 using a multi-layer sealing process.

Figure 2:
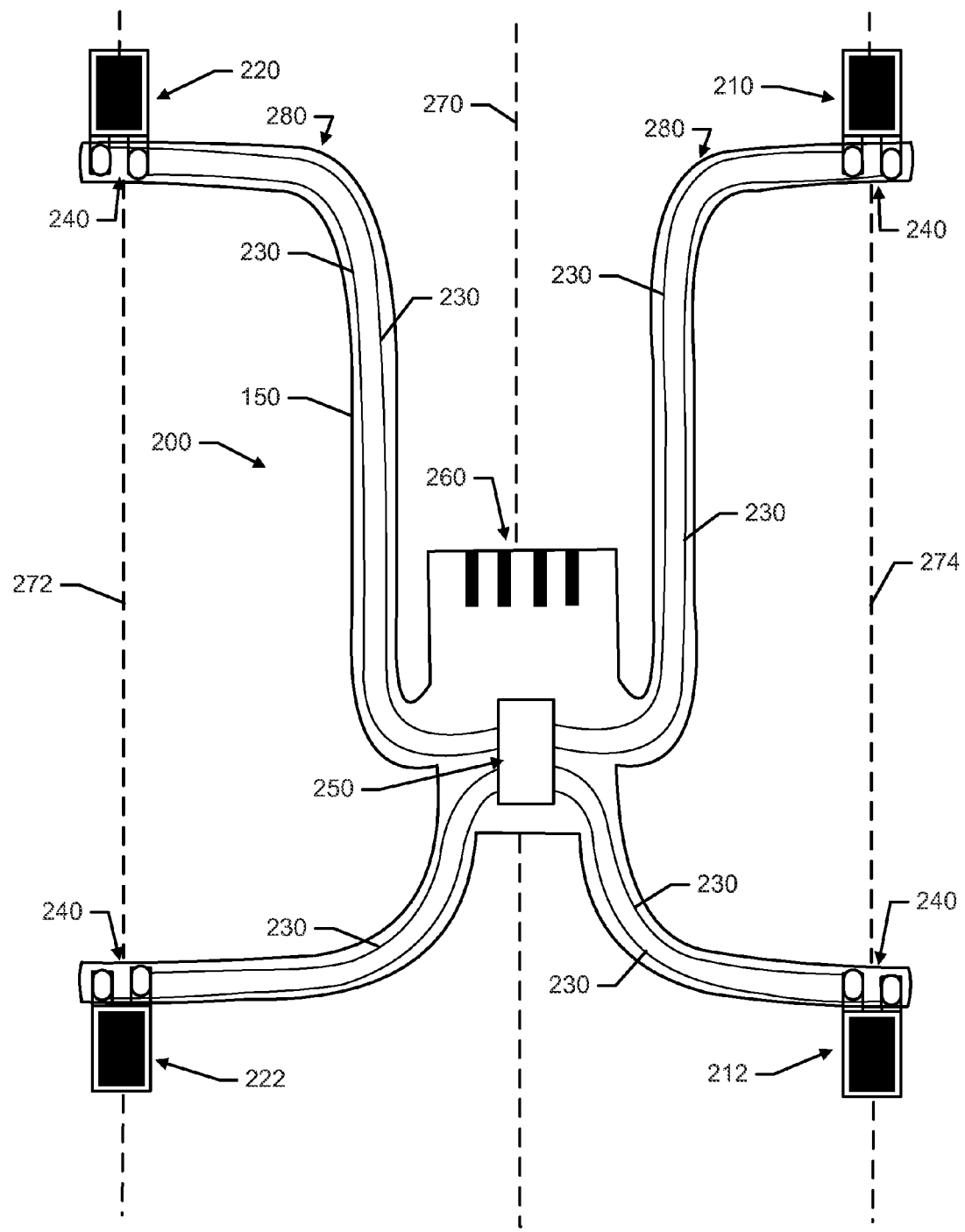
FIG. 2 is a plan view of an interface member that may be employed in connection with a load cell according to an example embodiment.

In an example embodiment, the strain gauges 140 may be connected to each other via a flex circuit forming an interface member 150 so that wiring is not needed to connect the strain gauges to each other. FIG. 2 is a plan view of the interface member 150 according to an example embodiment. In this regard, FIG. 2 illustrates a measurement assembly 200 according to an example embodiment. As shown in FIG. 2, the load cell measurement assembly 200 may include a first strain gauge 210 and a second strain gauge 212 that may combine to form a first strain gauge pair. The load cell measurement assembly 200 may also include a third strain gauge 220 and a fourth strain gauge 222 that may combine to form a second strain gauge pair.

The first and second strain gauge pairs (examples of strain gauges 140 of FIG. 1) may be disposed on opposing sides of a bar, as described above in reference to FIG. 1. However, it should be appreciated that the plan view of FIG. 2 illustrates the measurement assembly 200 in a two-dimensional view. Thus, although the first and second strain gauge pairs appear to be laid out in one plane in FIG. 2, it should be appreciated that the one plane is actually wrapped around a bar in practice.

In an example embodiment, the interface member 150 may be a flex circuit comprising a flexible substrate that can be adhered to a bar using any suitable adhesive material. The flexible substrate may include one or more layers of a substantially non-conductive material upon which conductive traces 230 may be provided. The conductive traces 230 may be disposed on or between layers of the flexible substrate to define paths for connecting various components of the measurement assembly 200.

In an example embodiment, as shown in FIG. 2, the interface member 150 may include pad portions 240 disposed at respective distal ends of the conductive traces 230. The pad portions 240 may be operably coupled to the strain gauges of the first and second strain gauge pairs. Direct coupling of the conductive traces 230 to the strain gauges at the pad portions 240 allows the interconnection of the strain gauges without the use of lead wires. Other ends of the conductive traces 230 may terminate at a potentiometer 250, which may be disposed proximate to a main cable connector 260. The main cable connector 260 and/or the potentiometer 250 may facilitate operation of the strain gauges of the first and second strain gauge pairs in relation to completing a Wheatstone bridge circuit and/or connection to other components needed for proper operation of a load cell in which the measurement assembly 200 may be employed.

In some embodiments, the interface member 150 may be oriented along the bar of the load cell so that the potentiometer 250 and the main cable connector 260 are disposed to be parallel with a neutral axis 270 of the bar of the load cell. Meanwhile, the first strain gauge pair may be disposed along a portion of the bar of the load cell at which max load strain for tension forces would be experienced (as indicated by dashed line 272) and the second strain gauge pair may be disposed along a portion of the bar of the load cell at which max load strain for compression forces would be experienced (as indicated by dashed line 274).

Multi turn arms 280 may be provided along the extension of the conductive traces 230 away from the respective pad portions 240 so that variations in bar diameter and gauge spacing can be accommodated when the interface member 150 is disposed onto the load cell for use. In an example embodiment, the multi turn arms 280 may have at least one about 90 degree turn along the length of the multi turn arms 280. The example of FIG. 2 shows two such 90 degree turns. By extending the flex circuit away from the strain gauges at an angle of 90 degrees from the axis of the pattern of the strain gauges, the flex circuit rapidly extends away from the strain gauges (where highest strain is experienced) and then turn about 90 degrees to keep most of the long runs of flex circuit material in lower strain areas. Thus, a majority of the flex circuit material that forms the interface member is disposed closer to the neutral axis where substantially no strain, or at least lighter strain, is likely to be encountered. Field failure potential may therefore be lowered by minimizing the material in the area of the load cell that is expected to experience the highest strain.

Figure 3:
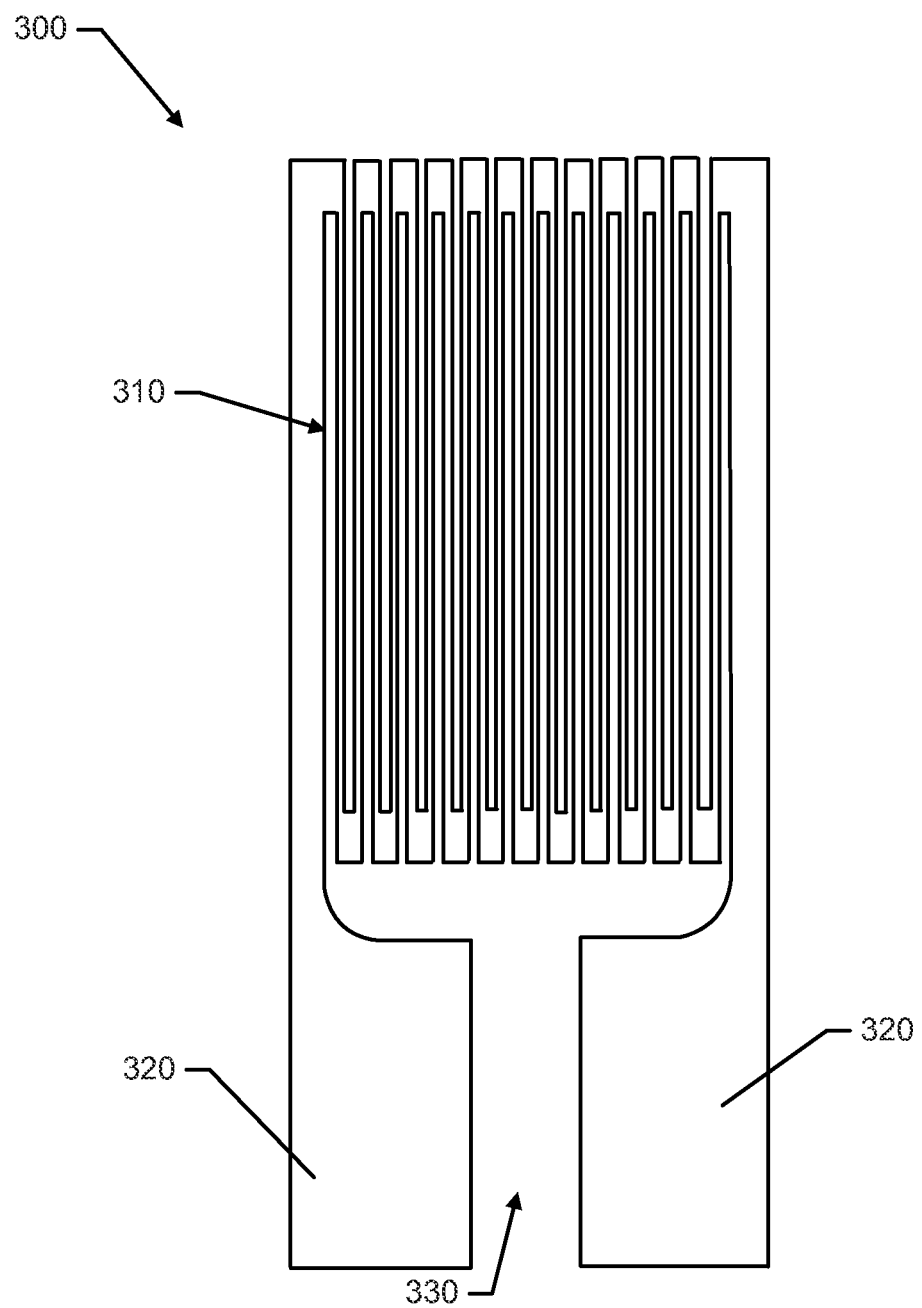
FIG. 3 illustrates a strain gauge that may be employed in connection with a load cell of an example embodiment.

FIG. 3 illustrates a strain gauge 300 of an example embodiment. The strain gauge 300 may be one example of a structure that can be employed to embody the first strain gauge 210, the second strain gauge 212, the third strain gauge 220, and/or the fourth strain gauge 222. As shown in FIG. 3, the strain gauge 300 may include a strain sensitive pattern portion 310 and output terminals 320. The strain sensitive pattern portion 310 may include a series of conductive lines disposed on a flexible substrate 330. The substrate 330 may be adhered to the load cell such that a long axis of the conductive runs forming the strain sensitive pattern portion 310 is substantially aligned with the long axis of the load cell. As strain and compression forces are exerted on the strain sensitive pattern portion 310, minor changes in the resistivity of the strain sensitive pattern portion 310 may be caused and may be detected. Measurement of the small changes in resistivity requires electrical communication between the output terminals 320 and Wheatstone bridge circuitry. In an example embodiment, the conductive traces 230 provide for communication of these resistivity changes via the interface member 150.

Figure 4:
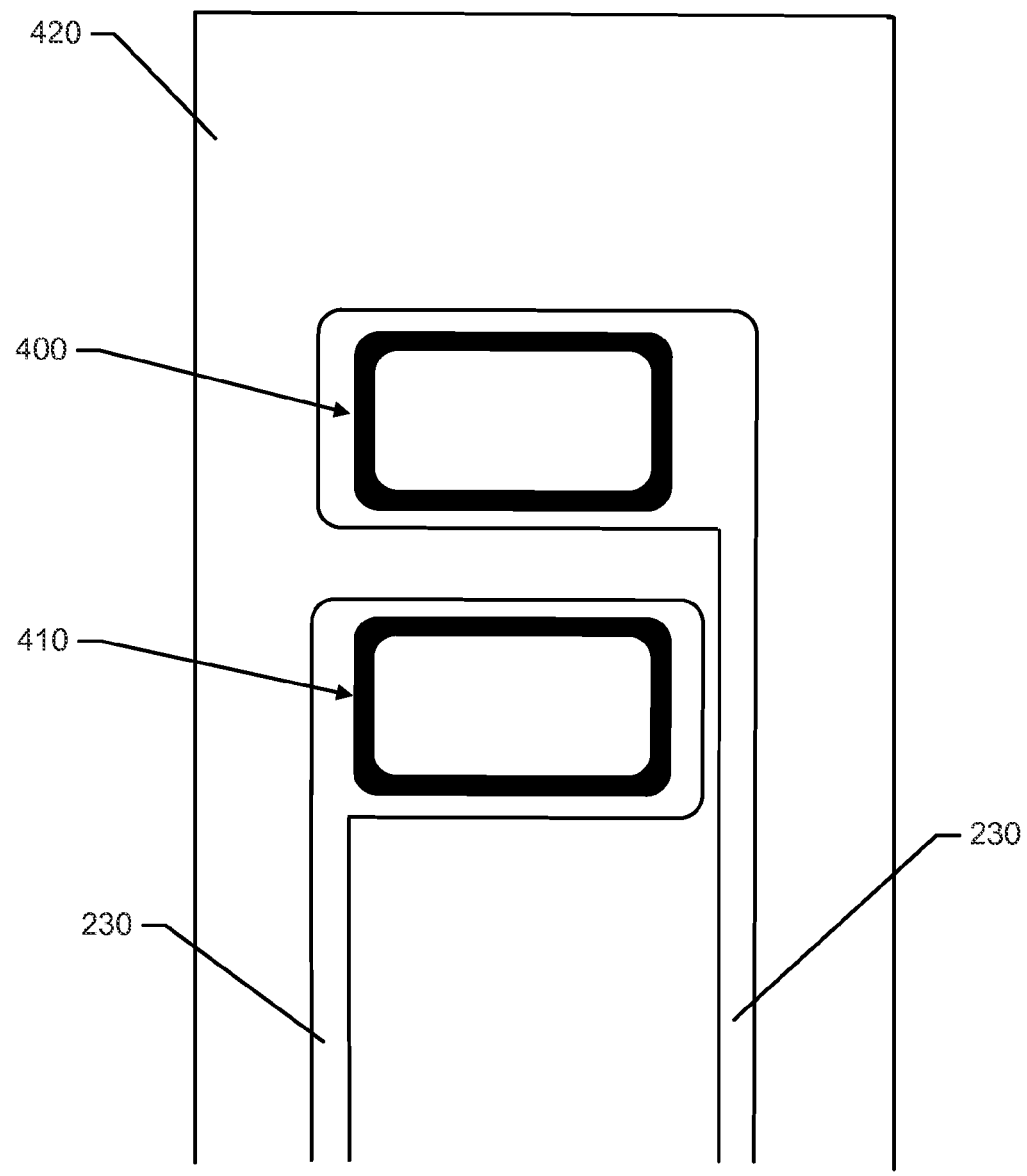
FIG. 4 illustrates a more detailed view of a pad portion of the interface member according to an example embodiment.
Figure 5:
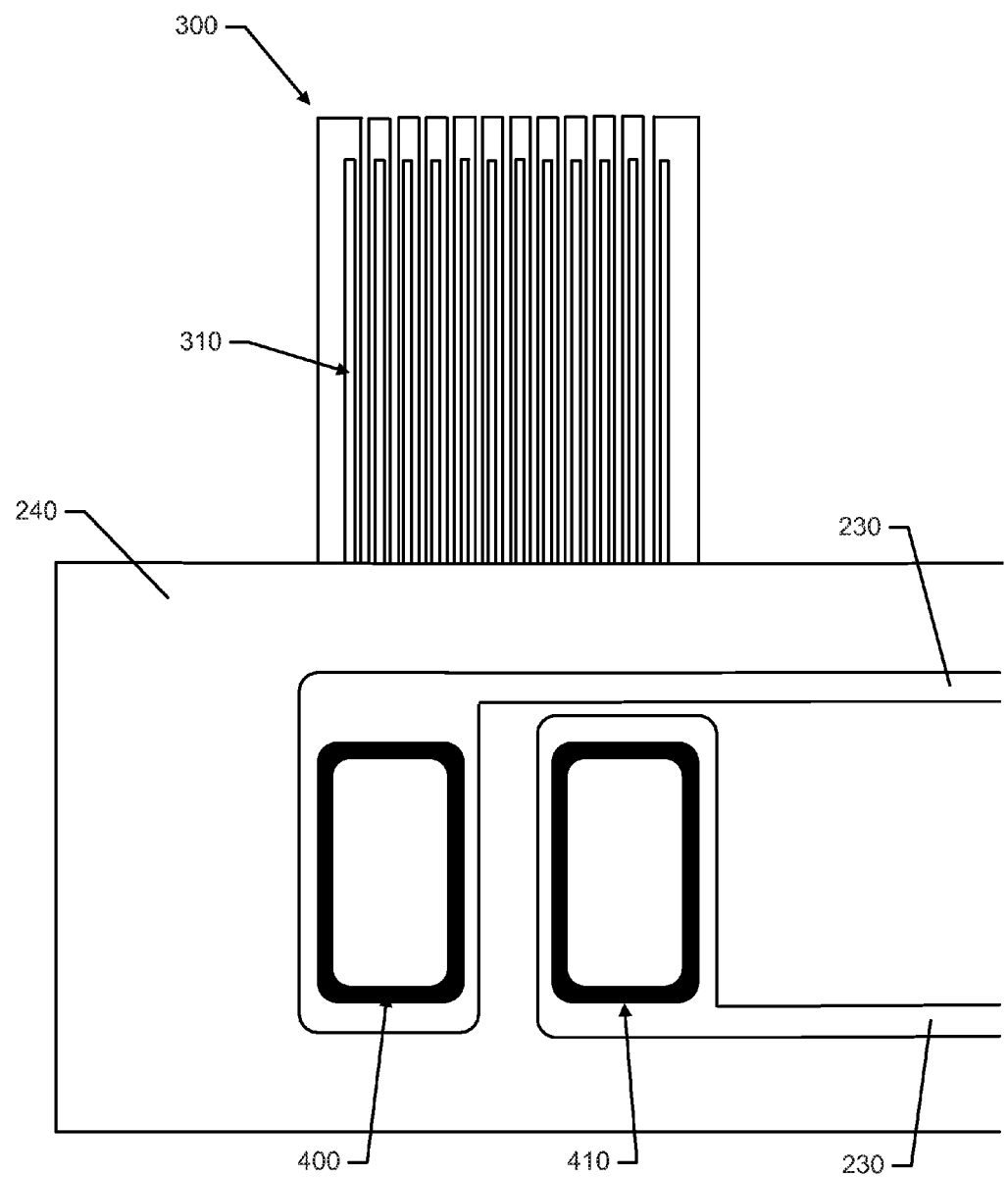
FIG. 5 shows the pad portion aligned over and operably coupled with the output terminals of the strain gauge of FIG. 3 according to an example embodiment.

FIG. 4 illustrates a more detailed view of the pad portion 240 of the interface member 150 according to an example embodiment. FIG. 5 shows the pad portion 240 aligned over and operably coupled with the strain gauge 300 of FIG. 3. As shown in FIG. 5, the pad portion 240 may include a first pad 400 disposed to align with one of the output terminals 320 of the strain gauge 300, and a second pad 410 disposed to align with the other of the output terminals 320. The first and second pads 400 and 410 may be shaped to substantially match a shape of the output terminals 320 and may be adhered to the output terminals 320 by any suitable method. Thus, for example, ultrasonic bonding, soldering, welding, or other methods may be employed to facilitate adhesion. In an example embodiment, the substrate 420 (or substrate layers) that form the interface member 150 may extend substantially 90 degrees away from the longitudinal length of the members of the strain sensitive pattern. The conductive traces 230 may travel in substantially the same direction as the substrate 420 along opposite sides of the substrate 420 and therefore from opposite ends of the respective first and second pads 400 and 410.

Accordingly, example embodiments may include a load cell or other weighing device which may include a bar having a supported end, an unsupported end and a sensor holding portion disposed between the supported end and the unsupported end, or an weighing assembly for use in the load cell. The load cell (or its weighing assembly) may further include a plurality of electronic sensors including a first strain gauge pair and a second strain gauge pair disposed along the sensor holding portion. The load cell (or its weighing assembly) may further include an interface member directly connecting the electronic sensors for weight calculation responsive to application of a load to the unsupported end. In some cases, the interface member may include a flex circuit.

In an example embodiment, modifications, additions or augmentations to the above described features may be added. Each such modification, addition or augmentation may be added by itself or in combination with one or more other modification, addition or augmentation (or even a combination including all of the modification, addition or augmentation. Some examples of such modification, addition or augmentation may include the interface member including conductive traces disposed on a flexible substrate and/or the flexible substrate being adhered to the sensor holding portion. In an example embodiment, the conductive traces may extend from pad portions disposed at corresponding ends of arms of the interface member to a hub portion of the interface member to couple the first strain gauge pair and the second strain gauge pair to a Wheatstone bridge. In some embodiments, the first strain gauge pair may be disposed along one side of the bar of the load cell at which a maximum compression force is experienced, and the second strain gauge pair may be disposed along an opposite side of the bar of the load cell at which a maximum tension force is experienced. In some cases, the arms may be provided to include multiple turns therein of about 90 degrees. In some embodiments, the interface member may be formed such that a majority of material forming the flex circuit is disposed closer to a neutral axis than to an axis along which the first strain gauge pair is positioned and an axis along which the second strain gauge pair is positioned. In an example embodiment, the conductive traces may operably couple the electronic sensors to a hub portion of the interface member. In such an example, the hub portion may be disposed at a neutral axis between an axis along which the first strain gauge pair is positioned and an axis along which the second strain gauge pair is positioned. In some cases, the electronic sensors may be operably coupled to a hub portion of the interface member via conductive traces on the interface member and without wires. In an example embodiment, pad portions of the interface member may overlap output terminals of respective ones of the electronic sensors. In such an example, the pad portions may be operably coupled to the output terminals via ultrasonic bonding. In some embodiments, a strain sensitive pattern of each of the electronic sensors may be disposed to substantially align with a long axis of the bar of the load cell and a substrate of the interface member may be disposed to extend away from the electronic sensors at an angle substantially perpendicular to the long axis of the bar of the load cell.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A load cell comprising:
   a bar having a supported end, an unsupported end and a sensor holding portion disposed between the supported end and the unsupported end;
   a plurality of electronic sensors including a first strain gauge pair and a second strain gauge pair disposed along the sensor holding portion; and
   an interface member directly connecting the electronic sensors for weight calculation responsive to application of a load to the unsupported end,
   wherein the interface member comprises a flex circuit including a potentiometer, wherein the interface member is disposed entirely on the bar, wherein the interface member includes conductive traces disposed on a flexible substrate, the flexible substrate being adhered to the sensor holding portion, wherein the conductive traces extend away from a hub portion of the interface member to pad portions operably coupled to a respective one of the plurality of electronic sensors and the pad portions and the electronic sensors are disposed at corresponding ends of arms of the interface member to couple the first strain gauge pair and the second strain gauge pair to complete a Wheatstone bridge, and wherein the hub portion includes the potentiometer.

2. The load cell of claim 1, wherein the first strain gauge pair is disposed along one side of the bar at which a maximum compression force is experienced, and wherein the second strain gauge pair is disposed along an opposite side of the bar at which a maximum tension force is experienced.

3. The load cell of claim 2, wherein the interface member is formed such that a majority of material forming the flex circuit is disposed closer to a neutral axis than to an axis along which the first strain gauge pair is positioned and an axis along which the second strain gauge pair is positioned.

4. The load cell of claim 2, wherein conductive traces operably couple the electronic sensors to a hub portion of the interface member, and wherein the hub portion is disposed at a neutral axis between an axis along which the first strain gauge pair is positioned and an axis along which the second strain gauge pair is positioned.

5. The load cell of claim 1, wherein the arms have multiple turns therein of about 90 degrees.

6. The load cell of claim 1, wherein the electronic sensors are operably coupled to a hub portion of the interface member via conductive traces on the interface member and without wires.

7. The load cell of claim 1, wherein pad portions of the interface member overlap output terminals of respective ones of the electronic sensors, and wherein the pad portions are operably coupled to the output terminals via ultrasonic bonding.

8. The load cell of claim 1, wherein a strain sensitive pattern of each of the electronic sensors is disposed to substantially align with a long axis of the bar and wherein a substrate of the interface member is disposed to extend away from the electronic sensors at an angle substantially perpendicular to the long axis of the bar.

9. A measurement assembly for a load cell, the measurement assembly comprising:

a plurality of electronic sensors including a first strain gauge pair and a second strain gauge pair disposed along a sensor holding portion of a bar, the sensor holding portion being disposed between a supported end and an unsupported end of the bar; and an interface member directly connecting the electronic sensors for weight calculation responsive to application of a load to the unsupported end, wherein the interface member comprises a flex circuit including a potentiometer, wherein the interface member is disposed entirely on the bar, wherein the interface member includes conductive traces disposed on a flexible substrate, the flexible substrate being adhered to the sensor holding portion, wherein the conductive traces extend away from a hub portion of the interface member to pad portions operably coupled to a respective one of the plurality of electronic sensors and the pad portions and the electronic sensors are disposed at corresponding ends of arms of the interface member to couple the first strain gauge pair and the second strain gauge pair to complete a Wheatstone bridge, and wherein the hub portion includes the potentiometer.

10. The measurement assembly of claim 9, wherein the first strain gauge pair is disposed along one side of the bar at which a maximum compression force is experienced, and wherein the second strain gauge pair is disposed along an opposite side of the bar at which a maximum tension force is experienced.

11. The measurement assembly of claim 10, wherein conductive traces operably couple the electronic sensors to a hub portion of the interface member, and wherein the hub portion is disposed at a neutral axis between an axis along which the first strain gauge pair is positioned and an axis along which the second strain gauge pair is positioned.

12. The measurement assembly of claim 9, wherein the arms have multiple turns therein of about 90 degrees.

13. The measurement assembly of claim 9, wherein the interface member is formed such that a majority of material forming the flex circuit is disposed closer to a neutral axis than to an axis along which the first strain gauge pair is positioned and an axis along which the second strain gauge pair is positioned.

14. The measurement assembly of claim 9, wherein the electronic sensors are operably coupled to a hub portion of the interface member via conductive traces on the interface member and without wires.

15. The measurement assembly of claim 9, wherein pad portions of the interface member overlap output terminals of respective ones of the electronic sensors, and wherein the pad portions are operably coupled to the output terminals via soldering, ultrasonic bonding, welding or other physical connection.

16. The measurement assembly of claim 9, wherein a strain sensitive pattern of each of the electronic sensors is disposed to substantially align with a long axis of the bar and wherein a substrate of the interface member is disposed to extend away from the electronic sensors at an angle substantially perpendicular to the long axis of the bar.

* * * * *